United States Patent
Morishima

(10) Patent No.: US 7,505,383 B2
(45) Date of Patent: Mar. 17, 2009

(54) OPTICAL DISC RECORDING APPARATUS AND METHOD OF FORMING AN IMAGE ON AN OPTICAL DISC

(75) Inventor: Morito Morishima, Fukuroi (JP)

(73) Assignee: Yamaha Corporation, Hamamatsu-shi (JP)

(*) Notice: Subject to any disclaimer, the term of this patent is extended or adjusted under 35 U.S.C. 154(b) by 324 days.

(21) Appl. No.: 10/606,810

(22) Filed: Jun. 26, 2003

(65) Prior Publication Data

US 2004/0057356 A1   Mar. 25, 2004

(30) Foreign Application Priority Data

Jun. 28, 2002   (JP)   ............... P.2002-190634

(51) Int. Cl.
*G11B 7/00*   (2006.01)

(52) U.S. Cl. .................. 369/47.4; 369/53.29

(58) Field of Classification Search ............. 369/47.4, 369/53.29
See application file for complete search history.

(56) References Cited

U.S. PATENT DOCUMENTS

| | | | |
|---|---|---|---|
| 4,027,217 A | 5/1977 | Harman | |
| 4,066,268 A | 1/1978 | Borchard et al. | |
| 4,622,564 A | 11/1986 | Kaku et al. | |
| 4,660,189 A * | 4/1987 | Tsukamura et al. | 369/53.25 |
| 4,814,594 A | 3/1989 | Drexler | |
| 4,899,224 A | 2/1990 | Ooba et al. | |
| 4,967,286 A | 10/1990 | Normula et al. | |
| 5,126,995 A | 6/1992 | Nishizawa | |
| 5,182,741 A | 1/1993 | Maeda et al. | |
| 5,317,337 A | 5/1994 | Ewaldt | |
| 5,398,231 A | 3/1995 | Shin | |
| 5,444,687 A * | 8/1995 | Okumura | 369/47.19 |
| 5,467,432 A | 11/1995 | Ota | |
| 5,498,509 A | 3/1996 | Shin et al. | |

(Continued)

FOREIGN PATENT DOCUMENTS

EP   0 329 122 B1   8/1989

(Continued)

OTHER PUBLICATIONS

Office Action, Chinese Patent Office, Nov. 26, 2004.

*Primary Examiner*—Wayne R Young
*Assistant Examiner*—Van N Chow
(74) *Attorney, Agent, or Firm*—Pillsbury Winthrop Shaw Pittman LLP

(57) ABSTRACT

In a case where an image of a density that is uniform over a substantially whole area of an optical disc (200) is to be formed, a servo circuit (138) controls the rotation speed of a spindle motor (130) to be constant, and an ALPC circuit (162) controls the current level of a drive signal Li so that the laser power is constant. In this case, a main control section (170) sets the movement distance of an optical pickup (100) to be larger in the inner peripheral side where the line width of the image is larger, and that of the optical pickup (100) to be smaller in the outer peripheral side where the line width is smaller. The main control section (170) sends to a the motor driver (142) instructions for moving the optical pickup (100) by a movement distance which is determined on the basis of the setting.

33 Claims, 12 Drawing Sheets

U.S. PATENT DOCUMENTS

| | | | |
|---|---|---|---|
| 5,504,688 A | 4/1996 | Letourneau | |
| 5,518,325 A | 5/1996 | Kahle | |
| 5,608,717 A | 3/1997 | Ito et al. | |
| 5,608,718 A | 3/1997 | Schiewe | |
| 5,616,447 A | 4/1997 | Arioka | |
| 5,627,895 A | 5/1997 | Owaki | |
| 5,668,589 A * | 9/1997 | Kuwabara et al. | 347/253 |
| 5,669,995 A | 9/1997 | Hong | |
| 5,675,570 A | 10/1997 | Ohira et al. | |
| 5,688,173 A | 11/1997 | Kitahara et al. | |
| 5,729,533 A | 3/1998 | Marquardt | |
| 5,745,457 A | 4/1998 | Hayashi et al. | |
| 5,748,607 A | 5/1998 | Ohira et al. | |
| 5,751,671 A | 5/1998 | Koike et al. | |
| 5,764,430 A | 6/1998 | Ottesen et al. | |
| 5,766,495 A | 6/1998 | Parette | |
| 5,768,245 A * | 6/1998 | Maeda et al. | 369/116 |
| 5,781,221 A | 7/1998 | Wen et al. | |
| 5,846,131 A | 12/1998 | Kitahara | |
| 5,866,354 A | 2/1999 | Froman | |
| 5,869,420 A | 2/1999 | Naito | |
| 5,875,156 A | 2/1999 | Ito et al. | |
| 5,915,858 A | 6/1999 | Wen | |
| 5,949,752 A | 9/1999 | Glynn et al. | |
| 5,958,651 A | 9/1999 | van Hoof et al. | |
| 5,967,676 A | 10/1999 | Cutler et al. | |
| 5,997,976 A | 12/1999 | Mueller et al. | |
| 6,019,151 A | 2/2000 | Wen et al. | |
| 6,020,977 A | 2/2000 | Kim | |
| 6,026,066 A | 2/2000 | Maezawa | |
| 6,034,930 A | 3/2000 | Kitahara | |
| 6,074,031 A | 6/2000 | Kahle | |
| 6,102,800 A | 8/2000 | Kitahara | |
| 6,104,677 A | 8/2000 | Kirihara et al. | |
| 6,109,324 A | 8/2000 | Bugner et al. | |
| 6,154,232 A | 11/2000 | Hickman | |
| 6,154,240 A | 11/2000 | Hickman | |
| 6,160,789 A | 12/2000 | Abraham | |
| 6,202,550 B1 | 3/2001 | Lee et al. | |
| 6,264,295 B1 | 7/2001 | Bradshaw et al. | |
| 6,270,176 B1 | 8/2001 | Kahle | |
| 6,295,261 B1 | 9/2001 | Kim | |
| 6,310,838 B1 | 10/2001 | Heemskerk et al. | |
| 6,317,392 B1 | 11/2001 | Lee et al. | |
| 6,317,399 B1 | 11/2001 | Ohtani et al. | |
| 6,329,035 B1 | 12/2001 | Iwasaki et al. | |
| 6,384,929 B1 | 5/2002 | Miller | |
| 6,386,667 B1 | 5/2002 | Cariffe | |
| 6,403,191 B1 | 6/2002 | Casagrande | |
| 6,440,248 B1 | 8/2002 | Mueller | |
| 6,452,883 B2 | 9/2002 | Chan | |
| 6,469,969 B2 | 10/2002 | Carson et al. | |
| 6,501,718 B1 | 12/2002 | Ono et al. | |
| 6,532,034 B2 | 3/2003 | Hirotsune et al. | |
| 6,534,142 B1 | 3/2003 | Hummell et al. | |
| 6,556,234 B1 | 4/2003 | Koyama | |
| 6,654,324 B1 | 11/2003 | Huber et al. | |
| 6,771,297 B2 | 8/2004 | Bronson | |
| 6,778,205 B2 | 8/2004 | Anderson et al. | |
| 6,844,889 B2 | 1/2005 | Bronson | |
| 6,862,033 B2 | 3/2005 | McClellan | |
| 6,862,063 B2 | 3/2005 | McClellan | |
| 6,864,907 B2 | 3/2005 | Bronson | |
| 6,903,760 B2 | 6/2005 | McFarland et al. | |
| 2001/0026531 A1 | 10/2001 | Onodera et al. | |
| 2001/0040867 A1 | 11/2001 | Onodera et al. | |
| 2002/0046177 A1 | 4/2002 | Oshima et al. | |
| 2002/0048241 A1 | 4/2002 | Kumagai et al. | |
| 2002/0191517 A1 * | 12/2002 | Honda et al. | 369/53.29 |
| 2003/0107959 A1 | 6/2003 | Norton et al. | |
| 2003/0108708 A1 | 6/2003 | Anderson et al. | |

FOREIGN PATENT DOCUMENTS

| | | | |
|---|---|---|---|
| EP | 0682341 B1 | 11/1995 | |
| EP | 0 762 407 B1 | 3/1997 | |
| EP | 0771677 | 5/1997 | |
| GB | 2 277 827 A | 11/1994 | |
| JP | 58-100235 | 6/1983 | |
| JP | 58-38932 | 3/1984 | |
| JP | 05-225570 | 9/1993 | |
| JP | 8-287526 | 11/1996 | |
| JP | 08-327339 | 12/1996 | |
| JP | 9-123606 | 5/1997 | |
| JP | 9-123607 | 5/1997 | |
| JP | 9-245371 | 9/1997 | |
| JP | 9-265760 | 10/1997 | |
| JP | 9-306144 | 11/1997 | |
| JP | 09306144 A | 11/1997 | |
| JP | 302316/1998 | 11/1998 | |
| JP | 10-320963 | 12/1998 | |
| JP | 11-003543 | 1/1999 | |
| JP | 110816/1999 | 1/1999 | |
| JP | 11-96561 | 4/1999 | |
| JP | 11110820 A | 4/1999 | |
| JP | 11161768 A | 6/1999 | |
| JP | 11-283356 | 10/1999 | |
| JP | 2000-105947 | 4/2000 | |
| JP | 2000-155989 | 6/2000 | |
| JP | 2000-173096 | 6/2000 | |
| JP | 2000-173238 | 6/2000 | |
| JP | 2000-251387 | 6/2000 | |
| JP | 2000169960 A | 6/2000 | |
| JP | 2000-251387 | 9/2000 | |
| JP | 2001-056937 | * | 2/2001 |
| JP | 2001-56937 A | 2/2001 | |
| JP | 2002-216396 | 8/2002 | |

* cited by examiner

FIG. 7

| | 1ST COLUMN | 2ND COLUMN | 3RD COLUMN | ...... | n-1TH COLUMN | nTH COLUMN |
|---|---|---|---|---|---|---|
| 1ST ROW | ON | OFF | ON | ...... | ON | OFF |
| 2ND ROW | OFF | OFF | OFF | ...... | OFF | OFF |
| 3RD ROW | ON | ON | OFF | ...... | OFF | ON |
| ...... | ...... | ...... | ...... | ...... | ...... | ...... |
| m-1TH ROW | OFF | ON | ON | ...... | ON | ON |
| mTH ROW | ON | OFF | OFF | ...... | OFF | ON |

FIG. 11

| RADIAL POSITION | NUMBER OF ROTATION |
|---|---|
| 1ST ROW | 1 ROTATION |
| 2ND ROW | 2 ROTATIONS |
| 3RD ROW | 3 ROTATIONS |
| ⋮ | ⋮ |
| m-1TH ROW | m-1 ROTATIONS |
| mTH ROW | m ROTATIONS |

OPTICAL DISC RECORDING APPARATUS AND METHOD OF FORMING AN IMAGE ON AN OPTICAL DISC

BACKGROUND OF THE INVENTION

The present invention relates to an optical disc recording apparatus which can form an image on an optical disc, and a method of forming an image on an optical disc.

Optical discs such as a CD-R (Compact Disc Recordable) or a CD-RW (Compact Disc Rewritable) are widely used for recording large volumes of information. An optical disc recording apparatus records information such as music data by applying a laser beam to a recording place which is formed in one face of an optical disc.

An image such as characters indicating a title, symbols, and the like is formed on a label face (opposite to the recording face) of the optical disc, thereby enabling data recorded in the recording face to be identified. Such an image is formed by printing it onto a label sheet with using a printing apparatus or the like, and then applying the label sheet to the label face of the optical disc.

Therefore, such a formation of an image on an optical disc requires a printing apparatus in addition to an optical disc recording apparatus. Furthermore, a troublesome work of applying a label sheet onto which an image is printed to an optical disc is necessary.

In order to solve the problems, an optical disc recording apparatus has been proposed which has a function of forming an image such as title characters on a label face or recording face of an optical disc as shown in FIG. 14 (hereinafter, referred to as drawing function), in addition to a function of recording information such as music data onto the optical disc (hereinafter, referred to as information recording function).

At present, as an optical disc recording apparatus which can realize the drawing function, proposed are an optical disc recording apparatus of the CLV (Constant Linear Velocity) system in which recording is performed while controlling the power of a laser beam emitted from an optical pickup to an optical disc to be constant, and changing the rotation number of a spindle motor that rotates the optical disc, and that of the CAV (Constant Angular Velocity) system in which recording is performed while controlling the rotation number of a spindle motor to be constant, and changing the power of a laser beam emitted from an optical pickup to the optical disc. Such optical disc recording apparatuses have the following problems.

In an optical disc recording apparatus of the CLV system, as described above, an image is formed on an optical disc while changing the rotation number of a spindle motor. In the case where address information specifying the laser beam irradiation position (i.e., the radial position of an optical pickup on the optical disc) is previously recorded on the optical disc, the address information can be reproduced so that the radial position of the optical pickup can be determined, thereby enabling a stable rotation control on the spindle motor (hereinafter, referred to as spindle servo).

In the case where address information is not previously recorded on the optical disc, such as the case where an image is to be formed on the label face of the optical disc, however, the radial position of the optical pickup cannot be determined, with the result that the spindle servo is unstable.

In such a case, the spindle servo is conducted on the basis of an FG (Frequency Generator) signal supplied from a rotation detector attached to the spindle motor, i.e., a pulse signal in which the pulse generation period is changed in accordance with the rotation speed (the rotation number per unit time) of the spindle motor. However, the FG signal involves a large error, and hence is not suitable for the spindle servo in which the rotation number of the spindle motor is continuously changed. The spindle servo affects the writing quality. When the spindle servo is not stabilized, consequently, there arises a problem in that the quality of an image to be formed on the optical disc is lowered.

By contrast, in an optical disc recording apparatus of the CAV system, as described above, an image is formed on an optical disc while maintaining the rotation number of a spindle motor and changing the laser power. Therefore, the spindle servo can be performed more stably than that in the case of an optical disc recording apparatus of the CLV system. When the rotation number of the spindle motor is controlled so as to be constant, the linear velocity of the inner peripheral side of the optical disc is lower than that of the outer peripheral side. In order to form an image of a density which is uniform over a substantially whole area of the optical disc, therefore, the power of a laser beam irradiated onto the inner peripheral side of the optical disc must be set to be lower than that of a laser beam irradiated onto the outer peripheral side. Namely, the formation of an image of a uniform density over a substantially whole area of the optical disc requires complex and troublesome works such as that of obtaining an optimum laser power on the basis of the radial position of the optical pickup.

SUMMARY OF THE INVENTION

The invention has been conducted in view of the above-described circumstances. It is an object of the invention to provide an optical disc recording apparatus which can form an image of a density that is uniform over a substantially whole area of an optical disc, and a method of forming an image on an optical disc.

In order to solve the aforesaid object, the invention is characterized by having the following arrangement.

(1) An optical disc recording apparatus comprising:

an optical pickup which applies a laser beam of substantially constant power to an optical disc;

a rotating section which rotates the optical disc at a substantially constant speed;

a feeding section which moves the optical pickup by a movement distance in a radial direction of the optical disc;

a detecting section which detects a radial position of the optical pickup with respect to the optical disc; and a movement distance controlling section which changes the movement distance set in the feeding section in accordance with the radial position of the optical pickup detected by the detecting section.

(2) The optical disc recording apparatus according to (1), wherein a rotation number of the optical disc rotated by the rotating section is controlled by the rotation controlling section to be substantially constant.

(3) The optical disc recording apparatus according to (1), wherein the power of the laser beam is controlled by a laser power controlling section to be substantially constant.

(4) The optical disc recording apparatus according to (1), wherein the feeding section moves the optical pickup each time when the optical disc is rotated once by the rotating section.

(5) The optical disc recording apparatus according to (1), wherein the movement distance controlling section changes the movement distance set in the feeding section, to be further reduced in a stepwise manner as the radial position of the optical pickup is further moved from an inner peripheral side of the optical disc toward an outer peripheral side.

(6) The optical disc recording apparatus according to (1) further comprising a storage section which stores feed management information for forming an image of a density which is uniform over a substantially whole area of the optical disc, and for obtaining the movement distance from the radial position of the optical pickup, wherein the movement distance controlling section obtains the movement distance based on the radial position of the optical pickup that is detected by said detecting section, and the feed management information.

(7) The optical disc recording apparatus according to (1), wherein the optical disc recording apparatus forms an image on the optical disc in accordance with image data with using the optical pickup, the rotating section, the feeding section, the detecting section and the movement distance controlling section.

(8) A optical disc recording apparatus comprising:
an optical pickup which applies a laser beam of substantially constant power to an optical disc;
a rotating section which rotates the optical disc at a substantially constant speed;
a feeding section which, each time when the optical disc is rotated with a number of rotations by the rotating section, moves the optical pickup by a movement distance in a radial direction of the optical disc;
a laser beam irradiation position controlling section which, when the optical disc is rotated with the preset number of rotations by the rotating section, changes an irradiation position of the laser beam so that the laser beam is moved along a different laser irradiation locus on the optical disc in each rotation;
a detecting section which detects a radial position of the optical pickup with respect to the optical disc; and
a rotation number controlling section which changes the rotation number set in the feeding section in accordance with the radial position of the optical pickup detected by the detecting section.

(9) The optical disc recording apparatus according to (8), wherein a rotation number of the optical disc rotated by the rotating section is controlled by the rotation controlling section to be substantially constant.

(10) The optical disc recording apparatus according to (8), wherein the power of the laser beam is controlled by a laser power controlling section to be substantially constant.

(11) The optical disc recording apparatus according to (8), wherein the optical disc recording apparatus forms an image on the optical disc in accordance with image data with using the optical pickup, the rotating section, the feeding section, the detecting section and the movement distance controlling section.

(12) A method of forming an image on an optical disc comprising steps of:
rotating the optical disc at substantially constant speed;
applying a laser beam of substantially constant power to the optical disc by an optical pickup;
moving the optical pickup by a movement distance in a radial direction of the optical disc; and
changing the movement distance in accordance with the radial position of the optical pickup on the optical disc.

(13) A method of forming an image on an optical disc comprising steps of:
rotating the optical disc at substantially constant speed;
applying a laser beam of substantially constant power to the optical disc by an optical pickup;
moving the optical pickup in a radial direction of the optical disc each time when the optical disc is rotated with a number of rotations;
changing an irradiation position of the laser beam so that, when the optical disc is rotated with the number of rotations, the laser beam is moved along a different laser irradiation locus on the optical disc in each rotation; and
changing the number of rotations in accordance with the radial in accordance with the radial position of the optical pickup on the optical disc.

(14) An optical disc including a heat-sensitive layer in which an image is formed by discoloring the heat-sensitive layer, the image being formed by the steps of:
rotating the optical disc at substantially constant speed;
applying a laser beam of substantially constant power to the optical disc by an optical pickup;
moving the optical pickup by a movement distance in a radial direction of the optical disc;
changing the movement distance in accordance with the radial position of the optical pickup on the optical disc.

(15) An optical disc including a heat-sensitive layer in which an image is formed by discoloring the heat-sensitive layer, the image being formed by the steps of:
rotating the optical disc at substantially constant speed;
applying a laser beam of substantially constant power to the optical disc by an optical pickup;
moving the optical pickup in a radial direction of the optical disc each time when the optical disc is rotated with a number of rotations;
changing an irradiation position of the laser beam so that, when the optical disc is rotated with the number of rotations, the laser beam is moved along a different laser irradiation locus on the optical disc in each rotation; and
changing the number of rotations in accordance with the radial in accordance with the radial position of the optical pickup on the optical disc.

BRIEF DESCRIPTION OF THE DRAWINGS

FIG. 7 is a diagram showing an example of stored contents of a frame memory in the embodiment.

FIG. 11 is a view showing an example of a rotation number management table in the embodiment.

DETAILED DESCRIPTION OF PREFERRED EMBODIMENTS

Figure 1:
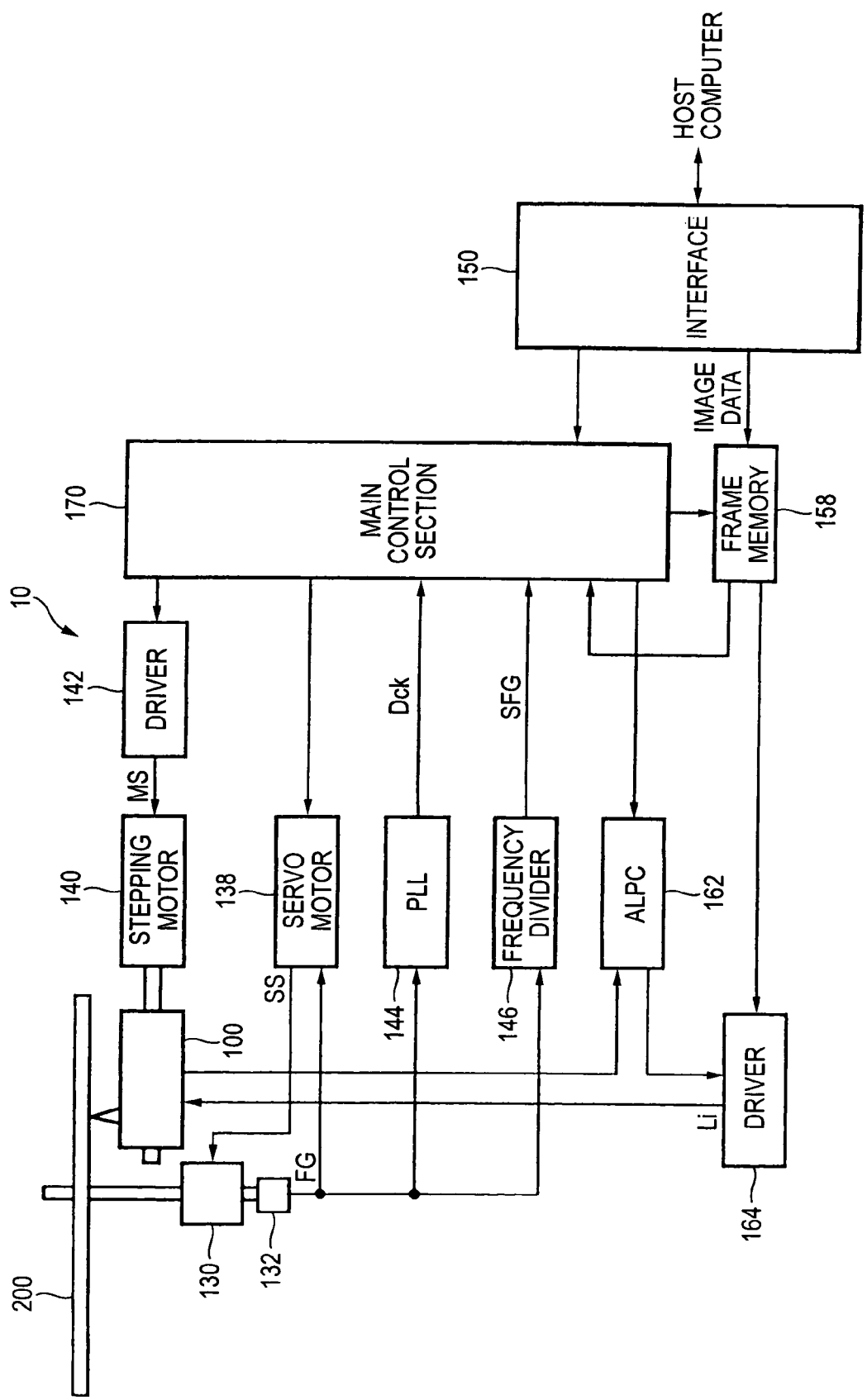
FIG. 1 is a block diagram showing the configuration of main portions of an optical disc recording apparatus of a first embodiment.

Hereinafter, embodiments in which the invention is applied to an optical disc recording apparatus having the drawing function will be described. The optical disc recording apparatus of each of the embodiments realizes formation of an image of a density that is uniform over a substantially whole area of an optical disc in a state where the rotation number of a spindle motor and the laser power are controlled so as to be constant.

A. First Embodiment

(1) Configuration of the Embodiment

FIG. 1 is a block diagram showing the configuration of main portions of an optical disc recording apparatus 10 of a first embodiment.

The optical disc recording apparatus 10 of the embodiment has the drawing function, and also the information recording function which is identical with that of a conventional optical disc recording apparatus. In addition to the various components shown in FIG. 1, therefore, other components (for example, an RF amplifier, a decoder, and a strategy circuit) which are similar to those mounted on a conventional optical disc recording apparatus are mounted on the optical disc recording apparatus 10. In order to facilitate the understanding of the invention, illustration and description of such components are omitted.

An optical disc 200 is a disc-shape recording medium such as a CD-R or a CD-RW, and has a recording face on which music data or like information can be recorded, and a label face on which an image can be formed. When an image is to be formed on the optical disc 200, the disc is set so that the label face is opposed to an optical pickup 100, and the optical pickup 100 irradiates a laser beam of a constant strength onto the label face to form a desired image. Although a case where an image is formed on the label face of the optical disc 200 will be described, an image may be formed on the recording face by, for example, using a blank area of the recording face.

A spindle motor 130 is a section which rotates the optical disc 200. Based on a control signal SS supplied from a servo circuit 138, the spindle motor rotates the optical disc 200.

A rotation detector 132 is a section which detects the rotation speed of the spindle motor 130, and, while using the counter electromotive force of the spindle motor 130, supplies an FG signal of a frequency corresponding to the rotation speed of the spindle motor 130, to the servo circuit 138.

Under the control by a main control section 170, the servo circuit 138 generates the control signal SS on the basis of the FG signal supplied from the rotation detector 132, and supplies the control signal to the spindle motor 130, thereby implementing the spindle servo. The servo circuit 138 conducts other servo controls including a focusing servo control (a servo control for focusing the laser beam) on the optical pickup 100, and a tracking servo control (a servo control for tracing a track where pits are formed), in addition to the spindle servo. In the embodiment, as described above, an image is formed on the optical disc 200 while controlling the rotation number of the spindle motor 130 so as to be constant. When an image is to be formed on the optical disc 200, therefore, the servo circuit 138 receives instructions for controlling the rotation number so as to be constant, from the main control section 170, and in accordance with the instructions implements the spindle servo so that the rotation number of the spindle motor 130 obtained from the FG signal is constant.

The optical pickup 100 comprises a laser diode, a four-split photodetector, and an objective lens actuator (which are not shown), and applies the laser beam to the optical disc 200 to record music data or the like and form an image such as title characters.

A stepping motor 140 moves the optical pickup 100 in a radial direction of the optical disc 200 in accordance with a motor drive signal MS supplied from a motor driver 142.

According to instructions from the main control section 170, the motor driver 142 generates the motor drive signal MS for moving the optical pickup 100 in the instructed direction and by the instructed movement distance, and supplies the signal to the stepping motor 140.

A PLL circuit 144 generates a clock signal Dck which is synchronized with the FG signal supplied from the rotation detector 132, and in which the frequency is a multiple of the frequency of the FG signal, and supplies the clock signal to the main control section 170.

A frequency divider 146 generates a reference signal SFG which is obtained by dividing the frequency of the FG signal supplied from the rotation detector 132 with a constant number, and supplies the reference signal to the main control section 170.

Figure 2:
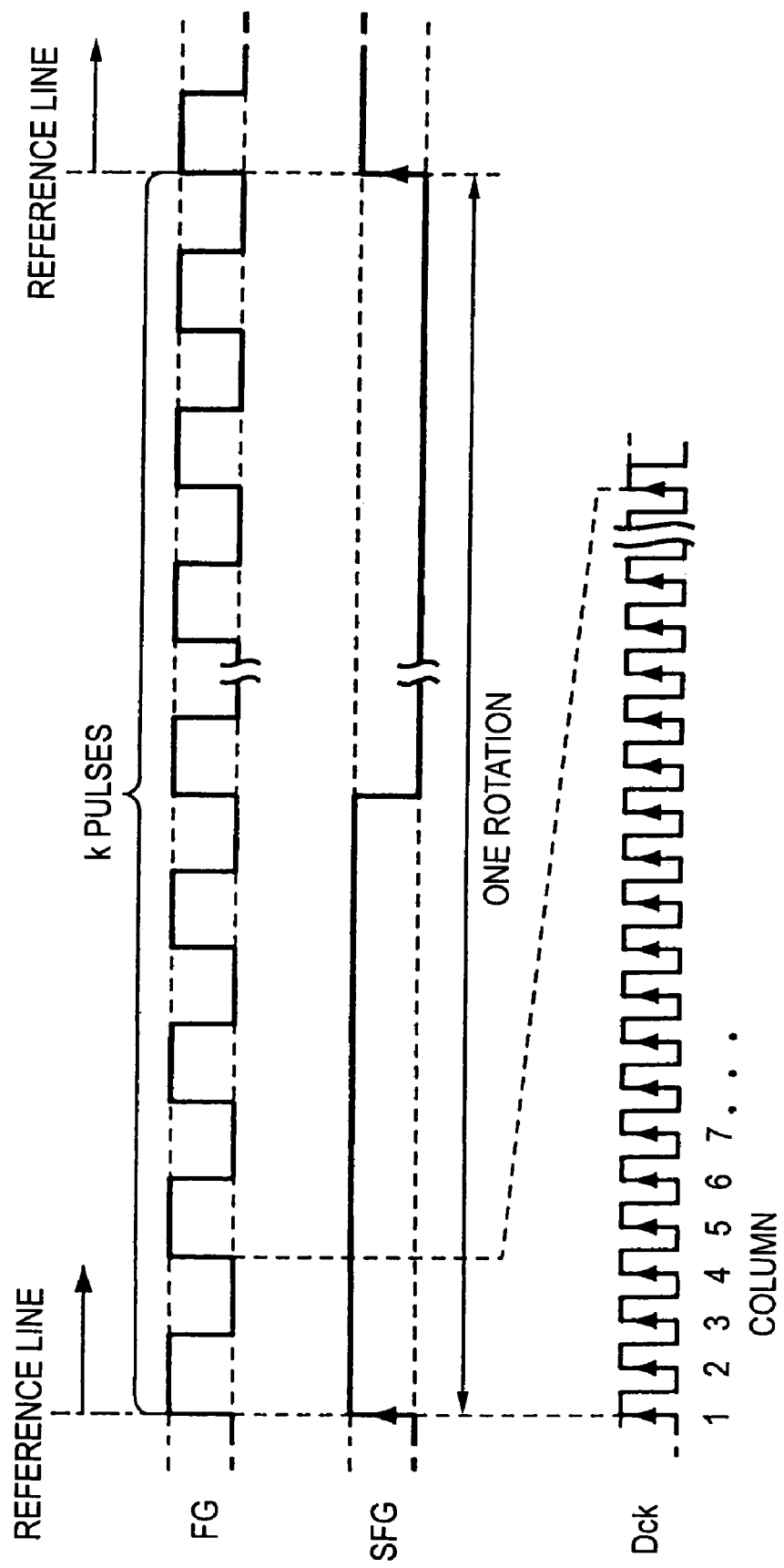
FIG. 2 is a timing chart showing an FG signal, a clock signal Dck, and a reference signal SFG in the embodiment.
Figure 3:
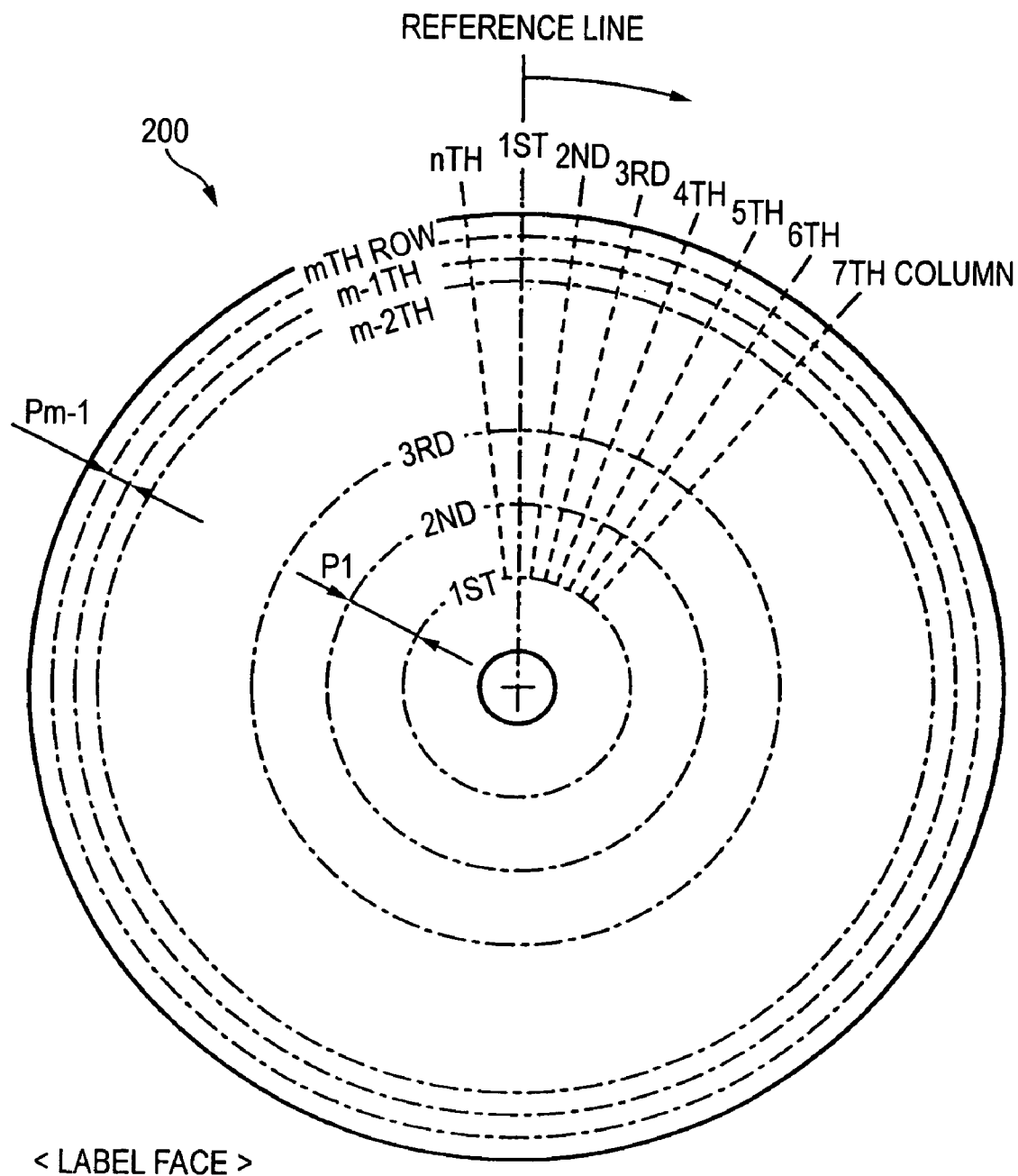
FIG. 3 is a diagram illustrating an image formation format of an optical disc in the embodiment.

FIG. 2 is a timing chart showing the FG signal, the clock signal Dck, and the reference signal SFG which are generated in the rotation detector 132, the PLL circuit 144, and the frequency divider 146, respectively, and FIG. 3 is a diagram illustrating the image formation format of the optical disc 200. In FIG. 3, for the sake of convenience, loci of movement in which the optical pickup 100 is moved for each rotation of the optical disc are defined as a 1st row, a 2nd row, a 3rd row, . . . , an m-th row (the last row) as advancing from the inner peripheral side to the outer peripheral side. One of radials is set as a reference line, and other radials are defined as a 1st column, a 2nd column, a 3rd column, . . . , an n-th column (the last column) as advancing in a clockwise direction. In FIG. 3, the widths of the rows, i.e., movement distances $p_1, \ldots, p_{m-1}$ of the optical pickup 100 in respective rotations of the optical disc are different from one another. The reason of this configuration will be described later.

As shown in FIG. 2, during a period when the spindle motor 130 makes one rotation (i.e., when the optical disc 200 makes one rotation), the rotation detector 132 generates a k number of pulses as the FG signal. In this case, the frequency divider 146 divides the frequency of the FG signal by k, and supplies the frequency-divided signal to the main control section 170 as the reference signal SFG. The main control section 170 detects rising timings and the number of risings in the reference signal SFG to detect the rotation timings (the timings when the laser beam irradiation position passes the reference line shown in FIG. 3) and rotation number of the optical disc 200.

By contrast, the PLL circuit 144 supplies the clock signal Dck which is obtained by multiplying the frequency of the FG signal by n/k, to the main control section 170. The one period of the clock signal Dck coincides with the period when the optical disc 200 is rotated by an angle corresponding to one column shown in FIG. 3. When the main control section 170 detects rising timings and the number of risings in the clock signal Dck, therefore, the main control section can detect the column of the optical disc 200 where the laser beam irradiation position of the optical pickup 100 exists. It is a matter of course that, in place of the rising timings of the reference signal SFG, other timings such as falling timings can be used, and, in place of the rising timings of the clock signal Dck, other timings such as falling timings can be used.

More exactly speaking, the reference line of the optical disc 200 should be the reference line with respect to the rotation shaft of the spindle motor 130. In an image forming process or the like, the optical disc 200 is rotated under the state where the disc is chucked to a table (not shown) which is directly coupled to the rotation shaft. Therefore, the reference line with respect to the rotation shaft of the spindle motor 130 maintains a fixed positional relationship with a certain one of radials of the optical disc 200. As far as the state is maintained, consequently, one radial of the optical disc 200 can be called the reference line of the optical disc 200.

Referring back to FIG. 1, the main control section 170 is configured by a CPU, a ROM, a RAM, and the like, and implements various control programs stored in the ROM to control various portions of the optical disc recording apparatus 10, and control also the movement distance of the optical pickup 100 for each rotation of the optical disc.

Figures 4, 5:
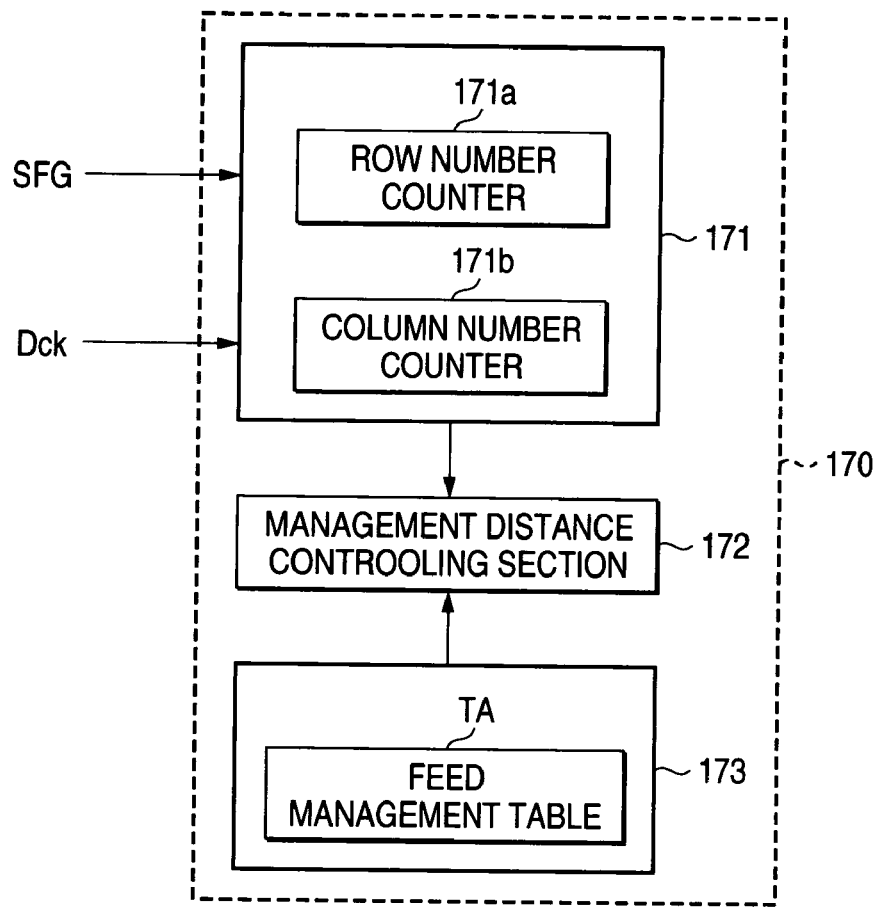
FIG. 4 is a block diagram illustrating the function of a main control section in the embodiment.
FIG. 5 is a view showing an example of a feed management table in the embodiment.

FIG. 4 is a block diagram illustrating the function of the main control section 170.

A radial position detecting section 171 detects rising timings of the reference signal SFG supplied from the frequency divider 146, rising timings of the clock signal Dck supplied from the PLL circuit 144, and the like, to know the row and column of the optical disc 200 where the optical pickup 100 is positioned, i.e., the radial position of the optical pickup 100.

More specifically, each time when a rise of the reference signal SFG is detected, the radial position detecting section 171 increments by "1" the count value of a row number counter 171a which is used for knowing the row where the optical pickup 100 is positioned. Each time when a rise of the clock signal Dck is detected, the radial position detecting section 171 increments by "1" the count value of a column number counter 171b which is used for knowing the column where the optical pickup 100 is positioned. The radial position detecting section 171 obtains the radial position of the optical pickup 100 from the count values of the row number counter 171a and the column number counter 171b.

A movement distance controlling section 172 determines the movement distance of the optical pickup 100 for each rotation of the optical disc. The movement distance of the optical pickup 100 is obtained on the basis of the radial position of the optical pickup 100 which is detected by the radial position detecting section 171, and a feed management table TA (see FIG. 5) which is stored in a storage section 173.

FIG. 5 is a view showing an example of the feed management table TA.

In the feed management table TA, radial positions of the optical pickup 100 and movement distances of the optical pickup 100 are correspondingly registered. As shown in FIG. 5, the movement distance of the optical pickup 100 is set so as to be further reduced in a stepwise manner as the radial position is further moved from the inner peripheral side toward the outer peripheral side. The reason of such setting will be described with reference to FIG. 6.

Figure 6A:
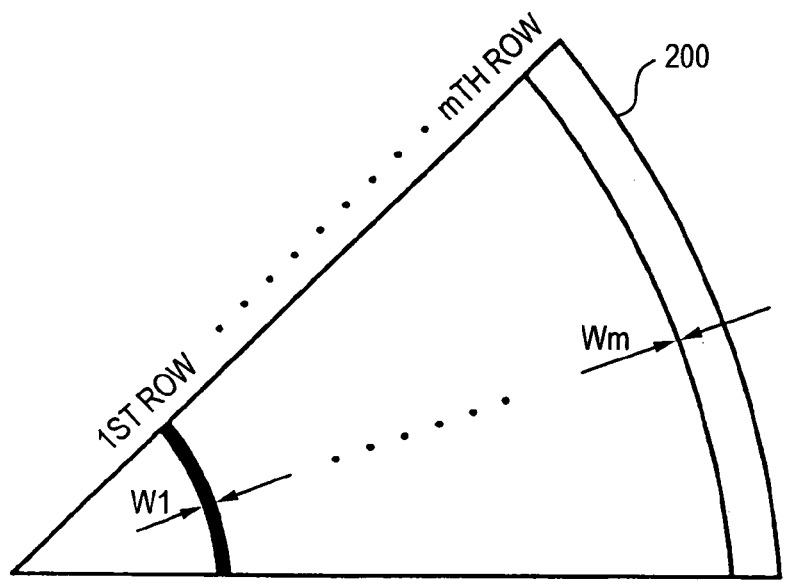
FIG. 6A is a partial enlarged view schematically showing an optical disc on which an image is formed.
Figure 6B:
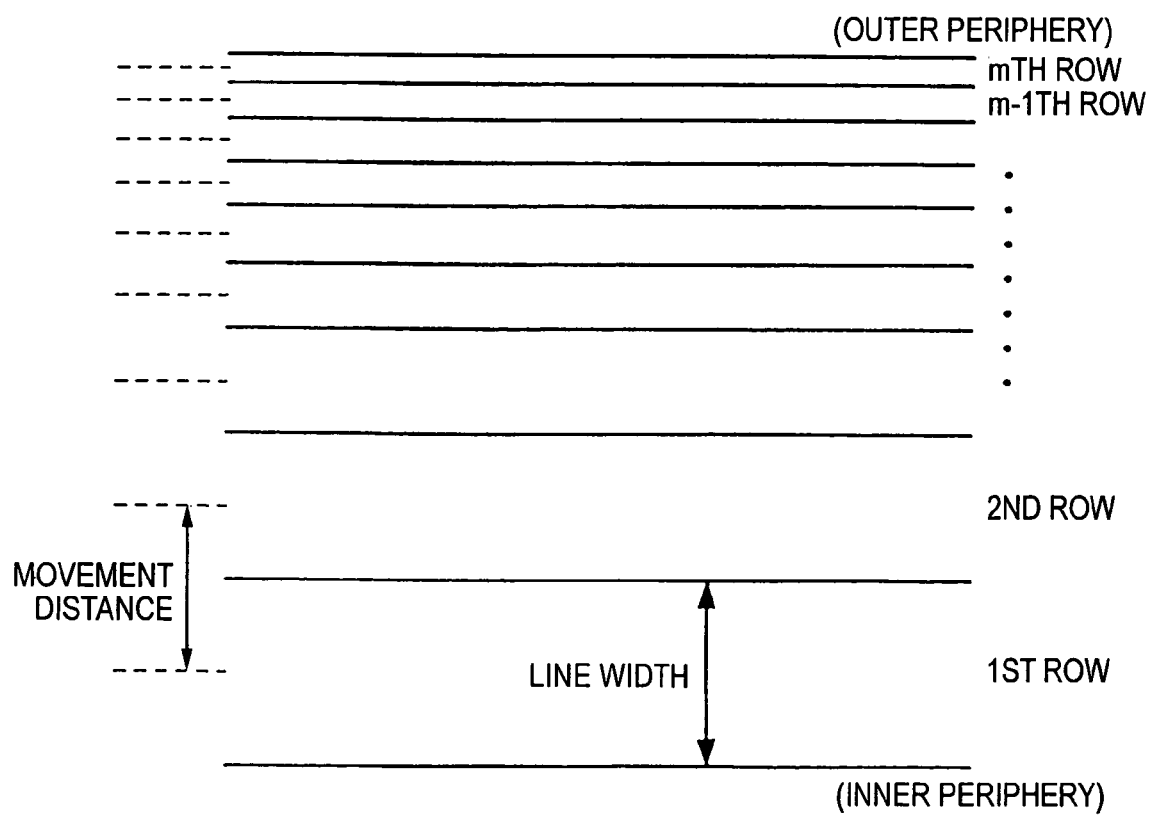
FIG. 6B is a diagram illustrating laser irradiation loci.

FIG. 6A is a partial enlarged view schematically showing the optical disc 200 on which an image is formed, and FIG. 6B is a diagram illustrating laser irradiation loci on the optical disc 200. In practice, laser irradiation loci are arcuate. In FIG. 6B, for the sake of convenience, however, they are shown in a linearly developed manner.

As described above, in the embodiment, a desired image is formed on the optical disc 200 in the state where not only the rotation number of the spindle motor 130 but also the laser power are controlled so as to be constant. When a laser beam is applied at the same power and for the same time period onto an area in the inner peripheral side (for example, the 1st row) of the optical disc 200 and that in the outer peripheral side (for example, the m-th row), a line width $W_1$ of the image which is formed in the 1st row is larger than a line width $W_m$ of the image which is formed in the m-th row (see FIG. 6A). Namely, a line width of an image which is formed in the inner peripheral side (hereinafter, referred to as an inner-peripheral side image) is larger than that of an image which is formed in the outer peripheral side (hereinafter, referred to as an outer-peripheral side image). As a result, the density of the inner-peripheral side image is higher than that of the outer-peripheral side image. When no countermeasure is taken, therefore, it is impossible to attain the object of the invention that "an image of a density that is uniform over a substantially whole area of an optical disc is formed."

In the embodiment, therefore, the movement distance of the optical pickup 100 is determined in accordance with the line width as shown in FIG. 6B. Specifically, the movement distance is set larger in the inner peripheral side where the line width is larger, and set smaller in the outer inner peripheral side where the line width is smaller. When the movement distance of the optical pickup 100 is set in this way, an image of a density that is uniform over a substantially whole area of the optical disc 200 can be formed even in the state where not only the rotation number of the spindle motor 130 but also the laser power are controlled so as to be constant.

Referring again to FIG. 1, an ALPC (Automatic Laser Power Control) circuit 162 controls the power of the laser beam irradiated by the optical pickup 100. The ALPC circuit 162 controls the current level of a drive signal Li so that the light intensity of the laser beam emitted from the optical pickup 100 coincides with the target value of the optimum laser power which is instructed by the main control section 170. In the embodiment, as described above, an image is formed on the optical disc 200 while controlling the laser power so as to be constant. When an image is to be formed on the optical disc 200, therefore, the ALPC circuit 162 receives instructions for controlling the laser power so as to be constant, from the main control section 170, and in accordance with the instructions controls the optical pickup so that the laser power is constant. In the invention, "the laser power is controlled so as to be constant" means that each of the write and bottom levels of the laser intensity which will be described later is controlled so as to be constant irrespective of the radial position of the optical pickup 100.

A frame memory 158 stores information which is supplied from a host computer via an interface 150, i.e., information relating to an image which is to be formed on the optical disc 200 (hereinafter, such information is referred to as image data). The image data is used for specifying image forming positions and non-image forming positions in the optical disc 200, and stored into the frame memory 158 in an arrangement of m rows and n columns.

FIG. 7 is a diagram showing an example of the stored contents of the frame memory 158.

As shown in the figure, ON data indicating that the laser strength is set to the write level (a laser intensity which is sufficient for discoloring a heat-sensitive layer of the optical disc 200) is stored at matrix elements corresponding to image forming positions, and OFF data indicating that the laser strength is set to the bottom level (a laser intensity by which the heat-sensitive layer of the optical disc 200 is not discolored) is stored at matrix elements corresponding to non-image forming positions.

Referring back to FIG. 1, the image data stored in the frame memory 158 are sequentially transferred to a laser driver 164 under the control of the main control section 170. The laser driver 164 generates the drive signal Li in which the control contents of the ALPC circuit 162 are reflected, in accordance with the image data which are sequentially transferred from the frame memory 158, and supplies the drive signal to the optical pickup 100. The intensity of the laser beam emitted from the optical pickup 100 is feedback-controlled so as to coincide with the target value supplied from the main control section 170.

In the above, the configuration of the optical disc recording apparatus 10 of the embodiment has been described in detail. Hereinafter, an operation in the case where a desired image is to be formed on the label face of the optical disc 200 with using the optical disc recording apparatus 10 will be described.

(2) Operation of the Embodiment

Figure 8:
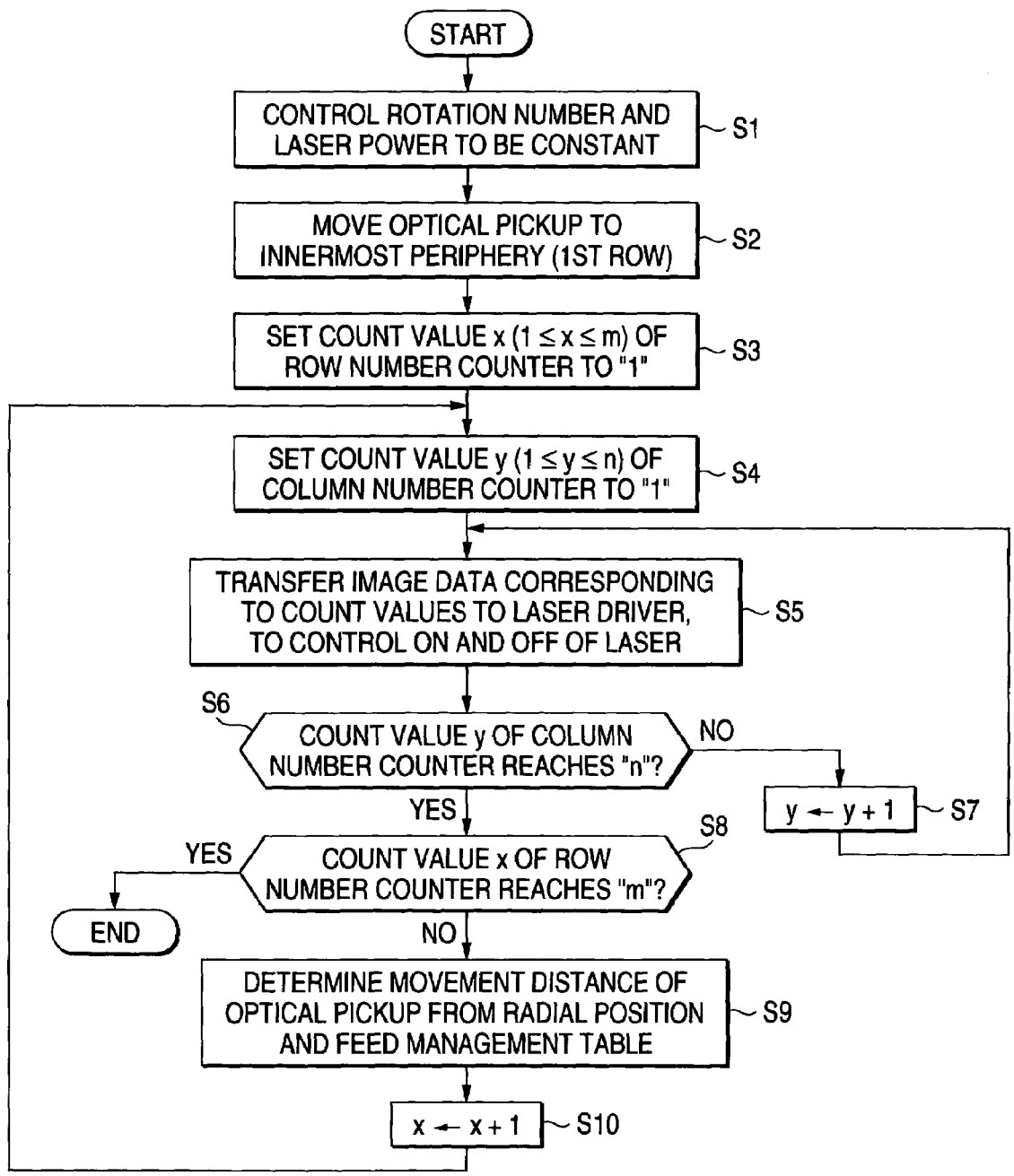
FIG. 8 is a flowchart illustrating an image forming process in the embodiment.

FIG. 8 is a flowchart illustrating an image forming process which is implemented in the image formation by the main control section 170 of the optical disc recording apparatus 10.

When a desired image is to be formed on the optical disc 200, the user first sets the optical disc 200 so that the label face of the optical disc 200 is opposed to the optical pickup 100. The user then operates the host computer and the like to select image data corresponding to the image to be formed, and inputs instructions for starting the image formation (hereinafter, referred to as image formation instructions).

When the image data is selected, the selected image data is supplied from the host computer to the optical pickup 100 via the interface 150, and then stored into the frame memory 158 (see FIG. 7).

Upon receiving the image formation instructions, the main control section 170 sends to the servo circuit 138 instructions for controlling the rotation number (rotation speed) of the spindle motor 130 so as to be constant, and to the ALPC circuit 162 instructions for controlling the laser power so as to be constant (step S1). In accordance with the instructions sent from the main control section 170, the servo circuit 138 executes the spindle servo so that the rotation speed of the spindle motor 130 is constant. On the other hand, in accordance with the instructions sent from the main control section 170, the ALPC circuit 162 controls the current level of the drive signal Li so that the laser power is constant.

After the main control section 170 sends the instructions to the servo circuit 138 and the ALPC circuit 162, the main control section sends to the motor driver 142 instructions for moving the optical pickup 100 to a position corresponding to the innermost periphery (the 1st row) of the optical disc 200 (step S2). In accordance with the instructions, the motor driver 142 generates the motor drive signal MS which is required for moving the optical pickup 100 to the position. The stepping motor 140 is rotated according to the motor drive signal MS supplied from the motor driver 142, with the result that the optical pickup 100 is moved to the position.

Next, the main control section 170 starts detection of rising timings of the reference signal SFG and the clock signal Dck. When a rise of the reference signal SFG is detected, the main control section 170 sets the count value x ($1 \leq x \leq m$) of the row number counter 171a to "1" (step S3). When a rise of the clock signal Dck is detected, the main control section 170 sets the count value y ($1 \leq y \leq n$) of the column number counter 171b to "1" (step S4).

Then, the main control section 170 reads out the image data of the matrix element corresponding to the count values (in this case, 1st row and 1st column) from the frame memory 158 (see FIG. 7), and transfers the image data to the laser driver 164. In the case where the transferred image data is ON data, the laser driver 164 generates the drive signal Li corresponding to the write level, and supplies the generated drive signal to the optical pickup 100. In accordance with the drive signal Li, the optical pickup 100 applies a laser beam of the write level to the optical disc 200, with the result that the heat-sensitive layer of a portion corresponding to the matrix element is discolored.

By contrast, in the case where the transferred image data is OFF data, the laser driver 164 generates the drive signal Li corresponding to the bottom level, and supplies the generated drive signal to the optical pickup 100. In accordance with the drive signal Li, the optical pickup 100 applies a laser beam of the bottom level to the optical disc 200, with the result that the heat-sensitive layer of a portion corresponding to the matrix element is not discolored.

Thereafter, the main control section 170 judges whether the count value y of the column number counter 171b reaches "n" or not, i.e., whether image data of the last column is processed or not (step S6). If it is judged that the count value y of the column number counter does not reach "n" (step S6: NO), the main control section 170 increments by "1" the count value of the column number counter 171b (step S7), and the control returns to step 5. A series of processes which are to be conducted after returning to step S5 are conducted in synchronization with one period of the clock signal Dck, and hence the image formation is performed on each column.

If, during repetition of the above-mentioned process, the main control section 170 detects in step S6 that the count value y of the column number counter 171b reaches "n" (step S6: YES), the control proceeds to step S8. Then, the main control section 170 judges whether the count value x of the row number counter 171a reaches "m" or not, i.e., whether image data of the last row is processed or not. If it is judged that the count value x of the row number counter 171a does not reach "m" (step S8: NO), the main control section 170 determines the movement distance of the optical pickup 100 from the feed management table TA shown in FIG. 5 and the radial position of the optical pickup 100 at this timing (step S9).

In the case where the radial position of the optical pickup 100 at this timing is 1st row and n-th column, for example, the main control section 170 conducts a search on the feed management table TA while using the radial position as a search key, thereby obtaining a movement distance $p_1$ which has a larger value. By contrast, in the case where the radial position of the optical pickup 100 at this timing is (m−1)th row and n-th column, the main control section 170 conducts a search on the feed management table TA while using the radial position as a search key, thereby obtaining a movement distance $p_{m-1}$ which has a smaller value. In this way, in the inner peripheral side of the optical disc 200 where the line width is larger, the movement distance is set larger, and, in the outer peripheral side of the optical disc 200 where the line width is smaller, the movement distance is set smaller, so that, even in a state where the rotation number of the spindle motor 130 and the laser power are controlled so as to be constant, an image of a density that is uniform over a substantially whole area of the optical disc 200 can be formed (the detail of the formation has been described in the paragraph of Configuration of the embodiment).

When the movement distance of the optical pickup 100 is determined as described above, the main control section 170 gives to the motor driver 142 instructions for moving the optical pickup 100 to a position which is separated by a distance corresponding to the movement distance toward the outer peripheral side. In accordance with the instructions, the motor driver 142 generates the motor drive signal MS which is required for moving the optical pickup 100 to the position. The stepping motor 140 is rotated in accordance with the motor drive signal MS supplied from the motor driver 142, with the result that the optical pickup 100 is moved to the position.

After giving the instructions, the main control section 170 increments by "1" the count value x of the row number counter 171*a* (step S10), and the control returns to step S4. A series of processes which are to be conducted after returning to step S4 are conducted in synchronization with one period of the reference signal SFG, and hence the image formation is performed on each row.

If, during repetition of the above-mentioned process, it is detected in step S8 that the count value x of the row number counter 171*a* reaches "m" (step S8: YES), the main control section 170 judges that the image formation on the optical disc 200 is completed, and ends the image forming process which has been described above.

As described above, according to the optical disc recording apparatus 10 of the embodiment, in the inner peripheral side where the line width is larger when a laser beam of the same power is applied, the movement distance of the optical pickup 100 is set larger, and, in the outer peripheral side where the line width is smaller, the movement distance of the optical pickup 100 is set smaller. When the movement distance of the optical pickup 100 is set in accordance with the line width of an image formed on the optical disc 200 in this way, an image of a density that is uniform over a substantially whole area of the optical disc 200 can be formed even in a state where the rotation number of the stepping motor 140 and the laser power are controlled so as to be constant.

(3) Modifications

The invention is not restricted to the embodiment described above, and can be modified in the following exemplary manners.

Modification 1

In the embodiment described above, the main control section 170 detects rising timings and the number of risings in the reference signal SFG and the clock signal Dck, to determine the radial position of the optical pickup 100. In the case where an image is to be formed in a blank area in a recording face in which address information is recorded, for example, the radial position of the optical pickup 100 may be determined by reproducing the address information which is obtained from the optical pickup 100 via the RF amplifier and the decoder (which are not shown).

Modification 2

In the embodiment described above, the main control section 170 determines the movement distance of the optical pickup 100 on the basis of the radial position of the optical pickup 100 and the feed management table TA. Alternatively, for example, a movement distance calculation algorithm (a function or the like) which can uniquely determine the movement distance from the radial position may be stored in the storage section 173, and the radial position may be substituted into the movement distance calculation algorithm to determine the movement distance. Namely, the feed management information set forth in the appended claims means any kind of information in which the movement distance of the optical pickup 100 can be obtained from the radial position of the optical pickup 100.

B. Second Embodiment (1) Configuration of the Embodiment

In the first embodiment described above, the movement distance of the optical pickup 100 is adequately set in accordance with the line width of an image to be formed on the optical disc 200, thereby forming an image of a density that is uniform over a substantially whole area of the optical disc 200.

By contrast, in the second embodiment, the number of overwritings (described later) of an image to be formed on the optical disc 200 is adequately set in accordance with the line width of the image, whereby an image of a density that is uniform over a substantially whole area of the optical disc 200 is formed.

Figure 9:
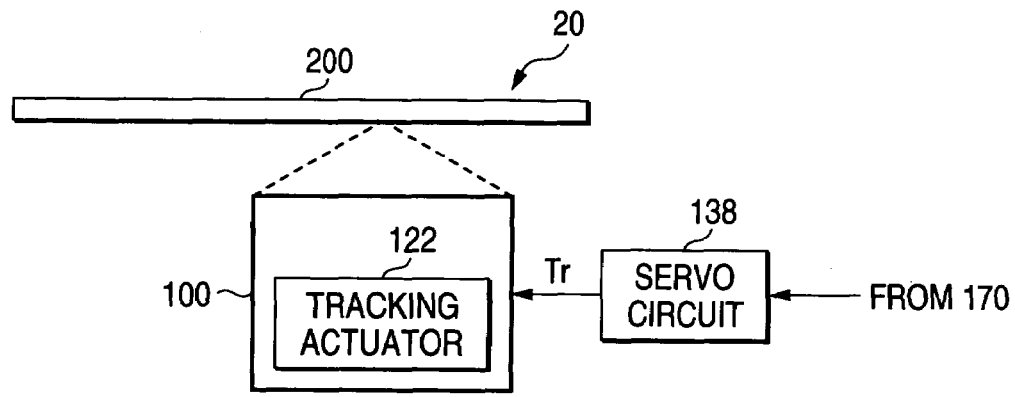
FIG. 9 is a diagram showing the configuration of main portions of an optical disc recording apparatus of a second embodiment.

FIG. 9 is a diagram showing the configuration of main portions of an optical disc recording apparatus 20 of the embodiment. In the following description, portions corresponding to those of the optical disc recording apparatus 10 of the first embodiment are denoted by the same reference numerals, and their description is omitted.

As well known in the art, in a conventional optical disc recording apparatus, when various information (such as music data) is to be recorded onto the optical disc 200, the servo circuit 138 generates a tracking signal which is used for eliminating a deviation of a spot position of the laser beam emitted from the optical pickup 100 from the center position of a guide groove formed in the optical disc 200, and drives a tracking actuator 122 in accordance with instructions given from the main control section 170, whereby correct tracking is realized.

By contrast, in the optical disc recording apparatus 20 of the embodiment, when an image is to be formed on the optical disc 200, the servo circuit 138 generates a tracking signal Tr (for example, a triangular signal) for image formation which will be described later, and drives the tracking actuator 122 in accordance with instructions given from the main control section 170, whereby tracking for controlling the laser beam irradiation position on the optical disc 200 is realized. In the following description, in order to avoid confusion in understanding, a tracking control which is performed in information recording is referred to as a usual tracking control, and a tracking control which is performed in image formation is referred to as an image formation tracking control.

Figure 10:
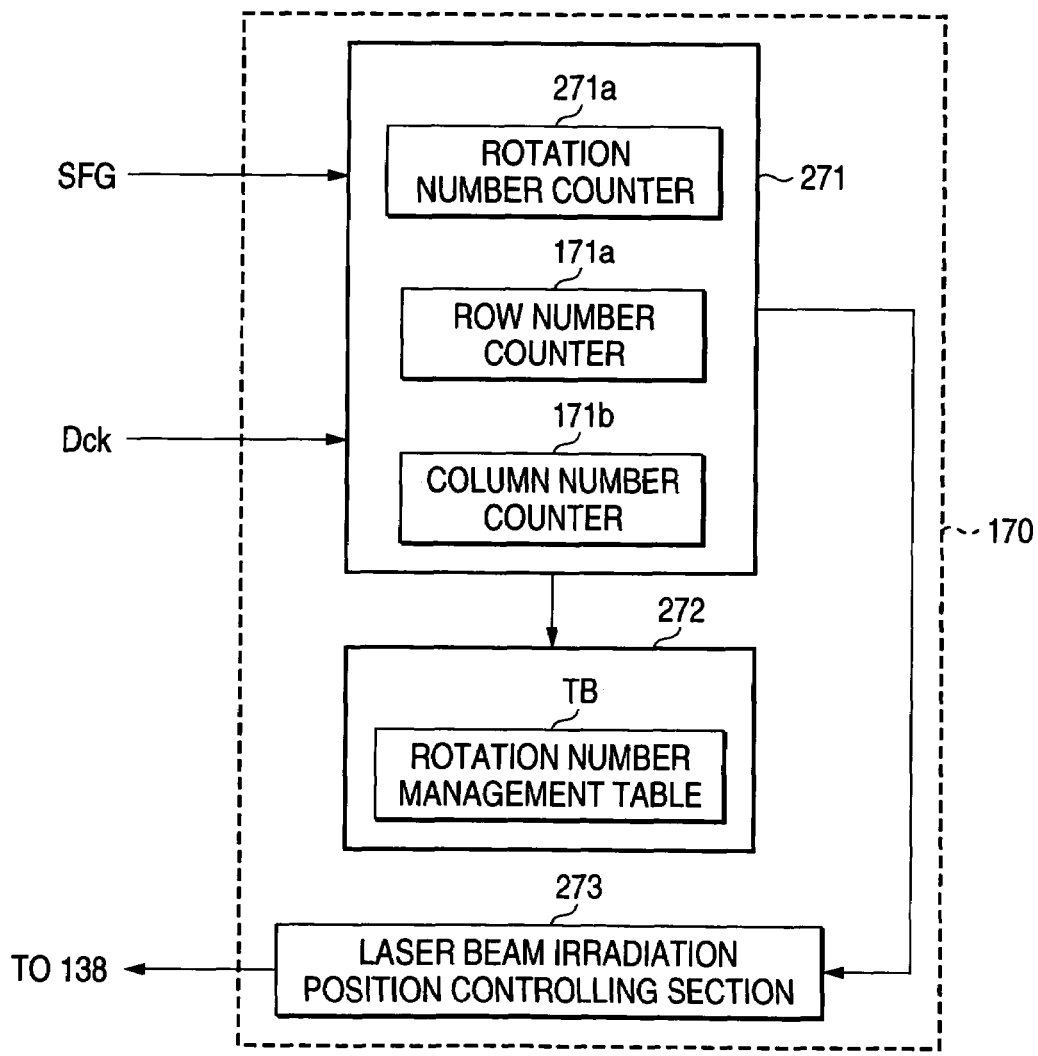
FIG. 10 is a block diagram illustrating the function of a main control section in the embodiment.

FIG. 10 is a block diagram illustrating the function of the main control section 170 in the embodiment.

A radial position detecting section 271 includes a rotation number counter 271*a* for obtaining the number of rotations of the optical disc 200, and the row and column number counters 171*a* and 171*b* which have been described in the first embodiment. Each time when a rising timing of the reference signal SFG supplied from the frequency divider 146 is detected, the radial position detecting section 271 increments by "1" the count value of the rotation number counter 271*a*. The radial position detecting section 271 conducts a search on a rotation number management table TB (see FIG. 11) while using the count value of the rotation number counter 271*a* as a search key.

The radial position detecting section 271 conducts such a search to know the radial position (the number of rows) of the optical pickup 100 and the number of rotations along the row at the present timing (this will be described later). Based on the result of the search, the radial position detecting section 271 increments the count value of the rotation number counter 271a, and also that of the row number counter 171a. Each time when a rising timing of the clock signal Dck supplied from the PLL circuit 144 is detected, the radial position detecting section 271 increments by "1" the count value of the column number counter 171b, to know the radial position (the number of columns) of the optical pickup 100 at the present timing.

FIG. 11 is a view showing an example of the rotation number management table TB stored in a storage section 272.

In the rotation number management table TB, the radial position (the number of rows) of the optical pickup 100 and the number of rotations at which the optical disc 200 is to be rotated are correspondingly registered. The rotation numbers of the optical disc 200 for respective rows are different from one another, and set so as to be further increased in a stepwise manner as the radial position is further moved from the inner peripheral side toward the outer peripheral side.

By conducting a search on the rotation number management table TB while using the count value of the rotation number counter 271a as a search key, the radial position detecting section 271 knows the radial position (the number of rows) of the optical pickup 100 and the number of rotations along the row at the present timing. In the case where the count value is "3", for example, the radial position detecting section 271 determines that the radial position (the number of rows) of the optical pickup 100 is the 2nd row, and the pickup makes two rotations along the 2nd row.

As described above, different rotation numbers for the respective rows are registered in the rotation number management table TB. The reason of this setting will be described. When a laser beam is applied at the same power and for the same time period in a state where the rotation number of the spindle motor 130 is controlled so as to be constant, the line width of inner-peripheral side image is larger than that of an outer-peripheral side image, with the result that the inner-peripheral side image is higher in density than the outer-peripheral side image. Therefore, an image is formed by applying the laser beam to the optical disc 200 in each rotation while the rotation number is set to a smaller value in the inner peripheral side where the line width is larger, and the rotation number is set to a larger value in the outer peripheral side where the line width is smaller.

However, when the laser beam is simply applied in each rotation, the laser beam irradiation position is moved along the same locus in plural rotations. In the embodiment, therefore, the tracking signal Tr for image formation is supplied in each rotation while setting only the phase of the signal to have a different value for each rotation, so that different laser irradiation loci are formed. An example of this will be described. The timing when the laser beam irradiation position passes the reference line is set as zero in the time axis. In the case where the optical disc 200 is rotated seven times in order to form an image of one row, the main control section 170 gives to the servo circuit 138 instructions for generating triangular signals as the image formation tracking signal Tr. In the triangular signal for the first rotation, the phase is set to zero, and, in the triangular signals for the second and subsequent rotations, the phase is sequentially delayed by $2\pi/7$. As a result, it is possible to form an image of a density which is uniform over a substantially whole area of the optical disc 200. The laser irradiation loci will be described in detail later.

Referring back to FIG. 10, when the radial position detecting section 271 knows the radial position (the number of rows) of the optical pickup 100 and the number of rotations along the row as described above, the section notifies a laser beam irradiation position controlling section 273 of this knowing.

Upon reception of the notification, the laser beam irradiation position controlling section 273 gives to the servo circuit 138 instructions for generating the image formation tracking signal Tr in which only the phase is made different for each rotation as described above. In accordance with the instructions, the servo circuit 138 generates the image formation tracking signal Tr in which only the phase is made different for each rotation, and supplies the signal to the tracking actuator 122, whereby the image formation tracking control is conducted in place of the usual tracking control. In the generation of the image formation tracking signal Tr, the manner of determining the variation amount of the phase can be suitably changed in accordance with, for example, the design of the optical disc recording apparatus 20.

Figure 12:
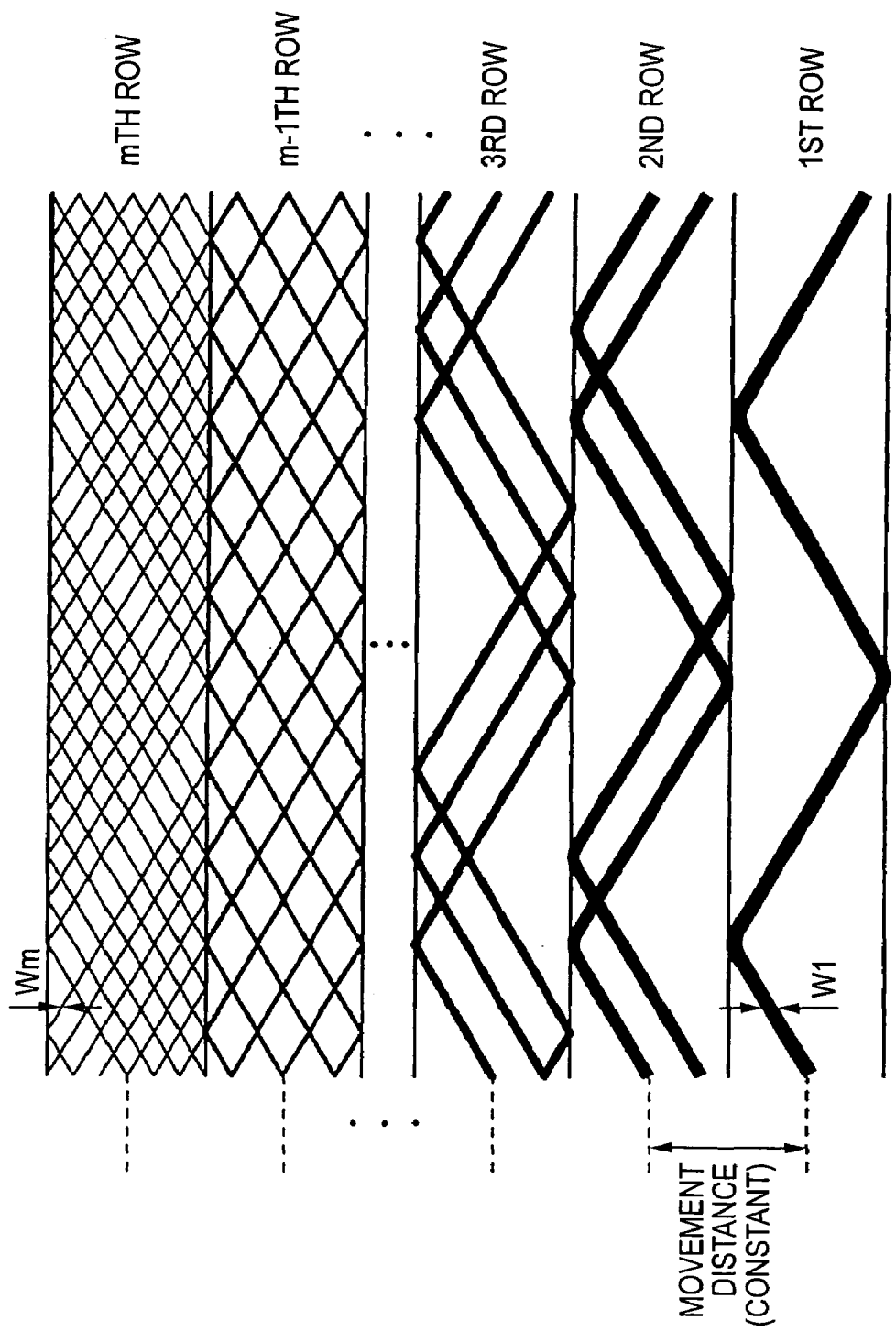
FIG. 12 is a view showing examples of laser irradiation loci of rows in the embodiment.

FIG. 12 is a view showing examples of laser irradiation loci of rows in the case where triangular signals are sequentially supplied as the image formation tracking signal Tr to the tracking actuator 122. In practice, laser irradiation loci are arcuate. In FIG. 12, for the sake of convenience, however, they are shown in a linearly developed manner. FIG. 12 shows the case where the optical disc 200 is rotated one time to form an image of the 1st row, rotated two times to form an image of the 2nd row, . . . , and rotated m times to form an image of the m-th row.

In the embodiment, when an image of one row is to be formed, the laser beam is irradiated onto the optical disc 200 by the number of rotations corresponding to the row, thereby discoloring the heat-sensitive layer. When an image of the 1st row is to be formed, therefore, the laser beam is irradiated only one time onto the optical disc 200. When an image of the 2nd row is to be formed, the laser beam is irradiated only two times onto the optical disc 200. When an image of the m-th row to be formed, the laser beam is irradiated m times onto the optical disc 200 (see FIG. 12). As shown in the figure, in the 2nd and subsequent rows in which the disc is rotated plural times, the laser irradiation loci in respective rotations are different from one other. In the following description, an operation of forming an image by irradiating the laser beam plural times along the same row is often called overwriting.

As described above, according to the embodiment, in the inner peripheral side where the line width is larger (see the line width $W_1$ shown in FIG. 12), the rotation number is set to a smaller value so as to reduce the number of overwritings, and, in the outer peripheral side where the line width is smaller (see the line width $W_m$ shown in FIG. 12), the rotation number is set to a larger value so as to increase the number of overwritings. As a result, it is possible to form an image of a density which is uniform over a substantially whole area of the optical disc 200.

The main portions of the optical disc recording apparatus 20 of the embodiment are configured as described above. Hereinafter, an operation in the case where a desired image is formed on the label face of the optical disc 200 with using the optical disc recording apparatus 20 will be described.

(2) Operation of the Embodiment

Figure 13:
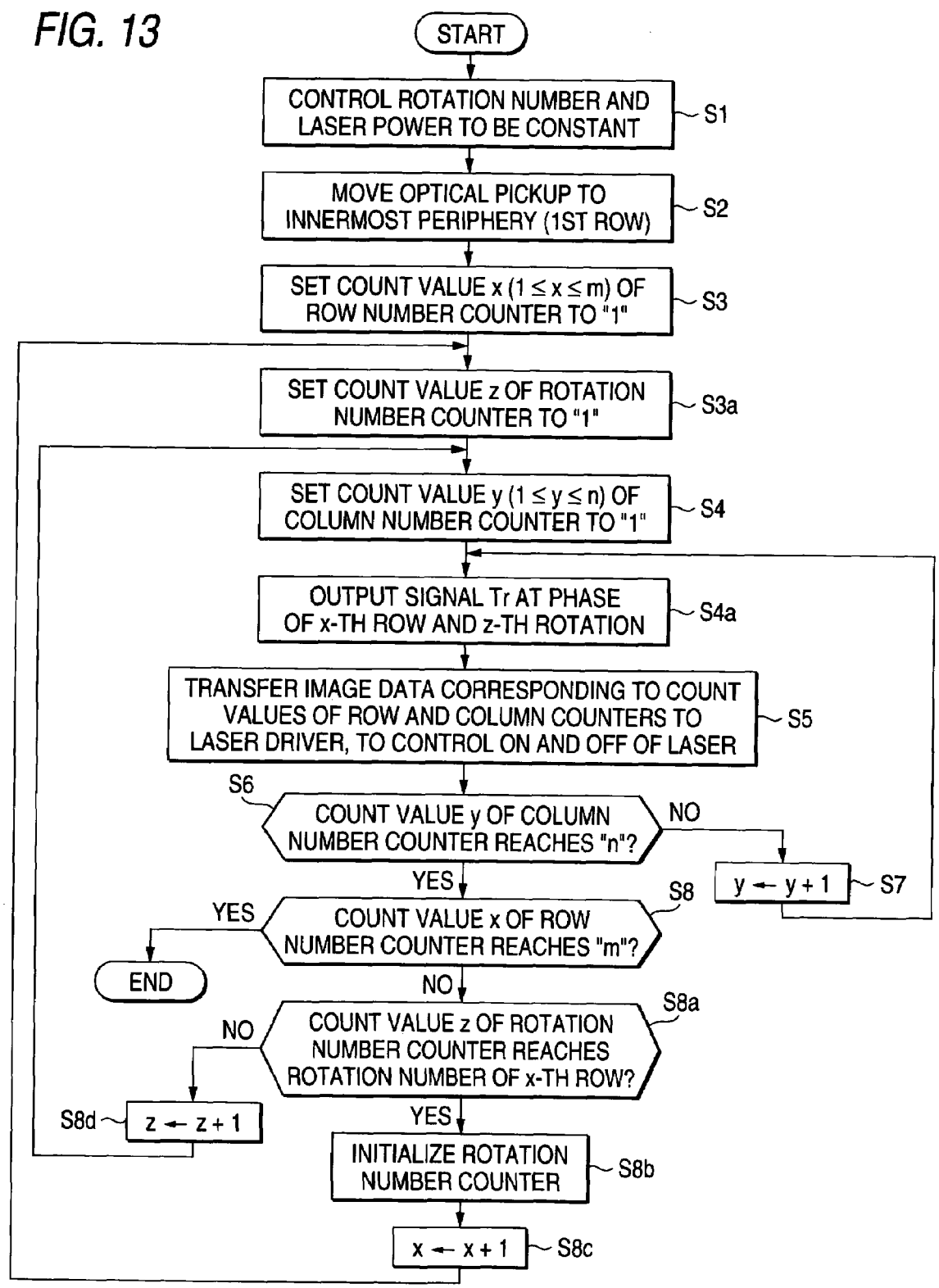
FIG. 13 is a flowchart illustrating an image forming process in the embodiment.
Figure 14:
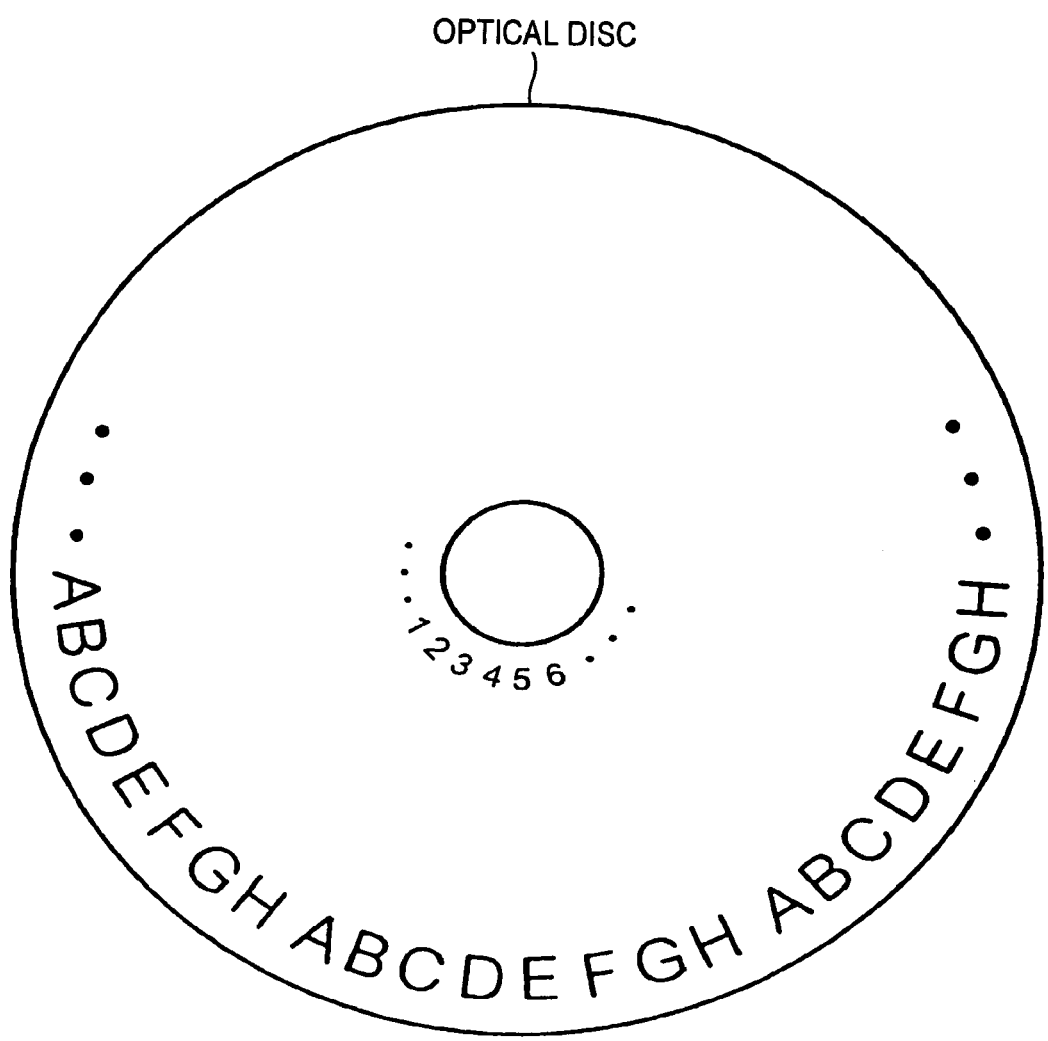
FIG. 14 is a view showing an example of an image formed on an optical disc.

FIG. 13 is a flowchart illustrating an image forming process which is implemented in the image formation by the main control section 170 of the optical disc recording apparatus 20. Steps in FIG. 13 which correspond to those in FIG. 8 described above are denoted by the same reference numerals, and their description is omitted. The operations which are to be conducted by the user to select image data corresponding to the image to be formed, and input image formation instructions are identical with those in the first embodiment, and hence their description is omitted.

In the main control section 170, the control proceeds from step S1 to step S2. When a rise of the reference signal SFG is detected, the count value x ($1 \leq x \leq m$) of the row number counter 171a is set to "1" (step S3). Then, the main control section 170 sets the count value z of the rotation number counter 271a to "1". When a rise of the clock signal Dck is detected, the count value y ($1 \leq y \leq n$) of the column number counter 171b is set to "1" (step S3a→step S4)

The main control section 170 refers the count value x of the row number counter 171a, and the count value z of the rotation number counter 271a, and sends to the servo circuit 138 instructions for generating the image formation tracking signal Tr at the phase which is attained by a z number of rotations along the x-th row (for example, the phase which is obtained when one rotation is made along the 1st row) (step S4a). Then, the main control section 170 reads out the image data of the matrix element corresponding to the count values from the frame memory 158 (see FIG. 7), and transfers the image data to the laser driver 164 (step S5).

The servo circuit 138 generates the image formation tracking signal Tr in accordance with the instructions given from the main control section 170, and the laser driver 164 generates the drive signal Li in accordance with the transferred image data. The signals are supplied to the optical pickup 100. As a result, the laser beam emitted from the optical pickup 100 follows the locus in the case of a z number of rotations along the n-th row, among the loci shown in FIG. 12.

Thereafter, the main control section 170 judges whether the count value y of the column number counter 171b reaches "n" or not, i.e., whether image data of the last column is processed or not (step S6). If it is judged that the count value y of the column number counter does not reach "n" (step S6: NO), the main control section 170 increments by "1" the count value of the column number counter 171b (step S7), and the control returns to step S4a. The series of processes which have been described above are repeatedly conducted, so that an image of one rotation is formed in the corresponding row.

If, during repetition of the above-mentioned series of processes, the main control section 170 detects in step S6 that the count value y of the column number counter 171b reaches "n" (step S6: YES), the control proceeds to step S8. Then, the main control section 170 judges whether the count value x of the row number counter 171a reaches "m" or not, i.e., whether image data of the last row is processed or not. If it is judged that the count value x of the row number counter 171a does not reach "m" (step S8: NO), the main control section 170 conducts a search on the rotation number management table TB while using the count value z of the rotation number counter 271a and the count value of the row number counter 171a as search keys, to judge whether the count value reaches the rotation number of the corresponding row or not (step S8a).

In the case where, at this timing, the count value z of the rotation number counter 271a is "1" and the count value x of the row number counter 171a is "2", for example, the main control section 170 judges that the count value does not reach the rotation number of the corresponding row (step S8: NO) because "2" is registered as the rotation number of the 2nd row in the rotation number management table TB, and the control proceeds to step S8d. In step S8d, the main control section 170 increments by "1" the count value z of the rotation number counter, and the control returns to step S4. When the series of processes which have been described above are repeatedly conducted, an image of rotations the number of which is defined in the corresponding row is formed.

By contrast, in the case where, at this timing, the count value z of the rotation number counter 271a is "2" and the count value x of the row number counter 171a is "2", the main control section 170 judges that the count value reaches the rotation number of the corresponding row (step S8: YES) because "2" is registered as the rotation number of the 2nd row in the rotation number management table TB, and the control proceeds to step S8b. In step S8b, the main control section 170 resets the count value z of the rotation number counter 271a, and then increments by "1" the count value x of the row number counter 171a (step S8c). Thereafter, the control returns to step S3a. When the series of processes which have been described above are repeatedly conducted, images over the innermost peripheral row of to the outermost peripheral row are formed.

If, during repetition of the above-mentioned processes, the main control section 170 detects in step S8a that the count value x of the row number counter 171a reaches "m" (step S8: YES), the section judges that the image formation on the optical disc 200 is completed, and the above-described image forming process is ended.

As described above, according to the optical disc recording apparatus 20 of the embodiment, in the inner peripheral side where the line width is larger, the rotation number is set to a smaller value and the number of overwritings is reduced, and, in the outer peripheral side where the line width is smaller, the rotation number is set to a larger value and the number of overwritings is increased. In this way, the rotation number in each row is set in accordance with the line width of an image to be formed on the optical disc 200, whereby an image of a density that is uniform over a substantially whole area of the optical disc 200 can be formed even in a state where the rotation number of the stepping motor 140 and the laser power are controlled so as to be constant.

(3) Modifications

The invention is not restricted to the embodiment described above, and can be modified in the following exemplary manners.

Modification 1

In the embodiment described above, a triangular signal is exemplarily used as the image formation tracking signal Tr. Alternatively, a DC voltage signal may be used. In the case where a DC voltage signal is used as the image formation tracking signal Tr, the voltage can be set to be different for each rotation. However, the displacement amount due to a DC voltage signal (i.e., the degree of a change which is caused by an application of a certain voltage) is not clearly known unless it is previously obtained by experiments or the like. In a configuration where a DC voltage is applied, moreover, there is a high possibility that an image is ununiformly formed because of generation of noises, dispersion of sensitivity, etc. Therefore, preferably, an AC signal such as the above-mentioned triangular signal or a sinusoidal signal is used as the image formation tracking signal Tr, and the signal is set so as to have a different phase for each rotation.

Modification 2

The first embodiment may be applied to the above-described embodiment. Specifically, the movement distance of the optical pickup 100 in the inner peripheral side is made different from that in the outer peripheral side, and also the rotation number (the number of overwritings) in each row in the inner peripheral side is made different from that in the outer peripheral side. In this way, the technical concept of "an image of a density that is uniform over a substantially whole area of the optical disc 200 is formed by changing the movement distance of the optical pickup 100," and that of "an image of a density that is uniform over a substantially whole area of the optical disc 200 is formed by changing the number of overwritings in each row" may be adequately combinedly used. It is a matter of course that any of the modifications of the first embodiment can be applied to the above-described embodiment.

Modification 3

Although the embodiments which use a CD-R or a CD-RW have been described, the invention can be applied to an optical disc of any kind, such as a DVD-R (Digital Versatile Disc Recordable) or a DVD-RAM (Digital Versatile Disc Random Access Memory). The drawing function (the image forming process and the like) which is realized by the optical disc recording apparatus 10 or 20 may be realized by software. Specifically, such software is installed on the optical disc recording apparatus 10 or 20 from a recording medium (for example, a CD-R) on which the software is recorded, or the software is downloaded from a server having the software via a network (e.g., the Internet), and then installed on the optical disc recording apparatus 10 or 20 via a personal computer or the like. In this way, the above-described various functions can be realized by software.

As described above, according to the invention, an image of a density that is uniform over a substantially whole area of an optical disc can be formed even in a state where the rotation number of a stepping motor and a laser power are controlled so as to be constant.

What is claimed is:

1. An optical disc recording apparatus for forming by a laser beam of substantially constant power an image on an optical disc, which includes a recording face for recording data and a label face for forming an image disposed on an opposite side of the recording face, address information specifying an irradiation radial position, the address information being included in the recording data and wherein no address information is recorded on the label face, the apparatus comprising:
   an optical pickup which applies the laser beam of substantially constant power to the optical disc, wherein when the optical pickup is opposed to the recording face, the optical pickup records the data on the recording face, and when the optical pickup is opposed to the label face, the optical pickup forms the image on the label face;
   a rotating section which rotates the optical disc at a substantially constant speed;
   a feeding section which moves the optical pickup by a movement distance in a radial direction of the optical disc;
   a detecting section which detects a radial position of the optical pickup with respect to the optical disc; and
   a movement distance controlling section which changes the movement distance set by the feeding section in accordance with the radial position of the optical pickup detected by the detecting section when forming the image on the label face,
   wherein the optical pickup, the rotating section, the feeding section and the detecting section are used for both data recording on the recording face and image forming on the label face.

2. The optical disc recording apparatus according to claim 1, wherein a rotation number of the optical disc rotated by the rotating section is controlled by a rotation controlling section to be substantially constant.

3. The optical disc recording apparatus according to claim 1, wherein the power of the laser beam is controlled by a laser power controlling section to be substantially constant.

4. The optical disc recording apparatus according to claim 1, wherein the feeding section moves the optical pickup each time when the optical disc is rotated once by the rotating section.

5. The optical disc recording apparatus according to claim 1, wherein the movement distance controlling section changes the movement distance set by the feeding section to be reduced in a stepwise manner as the radial position of the optical pickup is moved from an inner peripheral side of the optical disc toward an outer peripheral side.

6. The optical disc recording apparatus according to claim 1, further including a storage section which stores feed management information for forming an image of a density which is uniform over a substantially whole area of the optical disc, the feed management information including radial positions of the optical pickup and corresponding movement distances for the optical pickup,
   wherein the movement distance controlling section obtains the movement distance based on the radial position of the optical pickup that is detected by said detecting section, and a corresponding movement distance in the feed management information.

7. The optical disc recording apparatus according to claim 1, wherein the optical disc recording apparatus forms an image on the optical disc in accordance with image data with using the optical pickup, the rotating section, the feeding section, the detecting section and the movement distance controlling section.

8. The optical disc recording apparatus of claim 1, wherein the movement distance of the optical pickup is the movement distance of the laser beam in a disk radial direction.

9. The optical disc recording apparatus of claim 1, wherein the movement distance is set according to a line width of the optical disc.

10. The optical disc recording apparatus according to claim 1 further including a memory for storing image data defining the image to be formed on the optical disc, wherein
   the detecting section detects a radial position of the optical pickup with respect to the optical disc and a circumferential position of the optical pickup with respect to the optical disc, and
   the image data corresponding to the detected radial position and the circumferential position is read out form the memory and transferred to the optical pickup to control on/off of the laser beam.

11. A method of forming an image by a laser beam of substantially constant power on an optical disc which includes a recording face for recording data and a label face for forming an image disposed on an opposite side of the recording face, address information specifying an irradiation radial position, the address information being included in the recording data and wherein no address information is recorded on the label face, the method comprising:
   rotating the optical disc at substantially constant speed;
   applying the laser beam of substantially constant power to the optical disc by an optical pickup, wherein when the optical pickup is opposed to the recording face, the optical pickup records the data on the recording face, and when the optical pickup is opposed to the label face, the optical pickup forms the image on the label face;
   moving the optical pickup by a movement distance in a radial direction of the optical disc when forming the image on the label face; and
   changing the movement distance in accordance with the radial position of the optical pickup on the optical disc, wherein the optical pickup, a rotating section, a feeding section and a detecting section are used for both data recording on the recording face and image forming on the label face.

12. The method of claim 11, wherein a number of rotations the optical disk is rotated is controlled by a rotation controlling section to be substantially constant.

13. The method of claim 11, wherein the power of the laser beam is controlled by a laser power controlling section to be substantially constant.

14. The method of claim 11, wherein the moving of the optical pickup by the movement distance occurs each time when the optical disk is rotated once by a rotating section.

15. The method of claim 11, wherein the changing in the movement distance is reduced in a stepwise manner as the radial position of the optical pickup is moved from an inner peripheral side of the optical disc toward an outer peripheral side.

16. The method of claim 11, further including storing feed management information which is utilized for forming an image of a density which is uniform over a substantially whole area of the optical disc, the feed management information including radial positions of the optical pickup and corresponding movement distances for the optical pickup, and obtaining the movement distance of the optical pickup based on the radial position of the optical pickup detected by a detecting section and a corresponding movement distance in the feed management information.

17. The method of claim 11, further including forming an image on the optical disc in accordance with image data.

18. The method of claim 11, wherein the movement distance of the optical pickup is the movement distance of the laser beam in a disk radial direction.

19. The method of claim 11, wherein the movement distance is set according to a line width of the optical disc.

20. The method according to claim 11, further comprising:
storing, in a memory, image data defining the image to be formed on the optical disc,
detecting a radial position of the optical pickup with respect to the optical disc and a circumferential position of the optical pickup with respect to the optical disc, and
reading out the image data corresponding to the detected radial position and the circumferential position from the memory; and
transferring the read-out image data to the optical pickup to control on/off of the laser beam.

21. The method according to claim 11, further including:
storing, in a memory, image data defining the image to be formed on the optical disc,
detecting a radial position of the optical pickup with respect to the optical disc and a circumferential position of the optical pickup with respect to the optical disc, and
reading out the image data corresponding to the detected radial position and the circumferential position from the memory; and
transferring the read-out image data to the optical pickup to control on/off of the laser beam.

22. An optical disc including a heat sensitive layer in which an image is formed by discoloring the heat-sensitive layer with a laser beam of substantially constant power, the optical disc includes a recording face for recording data and a label face for forming an image disposed on an opposite side of the recording face, address information specifying an irradiation radial position, the address information being included in the recording data and wherein no address information is recorded on the label face, the image being formed by the method comprising:

rotating the optical disc at substantially constant speed;
applying the laser beam of substantially constant power to the optical disc by an optical pickup, wherein when the optical pickup is opposed to the recording face, the optical pickup records the data on the recording face, and when the optical pickup is opposed to the label face, the optical pickup forms the image on the label face;
moving the optical pickup by a movement distance in a radial direction of the optical disc when forming the image on the label face; and
changing the movement distance in accordance with the radial position of the optical pickup on the optical disc,
wherein the optical pickup, a rotating section, a feeding section and a detecting section are used for both data recording on the recording face and image forming on the label face.

23. The optical disc of claim 22, wherein a number of rotations the optical disk is rotated is controlled by a rotation controlling section to be substantially constant.

24. The optical disc of claim 22, wherein the power of the laser beam is controlled by a laser power controlling section to be substantially constant.

25. The optical disc of claim 22, wherein the moving of the optical pickup by the movement distance occurs each time when the optical disk is rotated once by a rotating section.

26. The optical disc of claim 22, wherein the changing in the movement distance is further reduced in a stepwise manner as the radial position of the optical pickup is further moved from an inner peripheral side of the optical disc toward an outer peripheral side.

27. The optical disc of claim 22, further including storing feed management information which is utilized for forming an image of a density which is uniform over a substantially whole area of the optical disc, the feed management information including radial positions of the optical pickup and corresponding movement distances for the optical pickup, and obtaining the movement distance of the optical pickup based on the radial position of the optical pickup detected by a detecting section and a corresponding movement distance in the feed management information.

28. The optical disc of claim 22, further including forming an image on the optical disc in accordance with image data.

29. The optical disc of claim 22, the movement distance of the optical pickup is the movement distance of the laser beam in a disk radial direction.

30. The optical disc of claim 22, wherein the movement distance is set according to a line width of the optical disc.

31. An optical disc recording apparatus for forming by a laser beam of substantially constant power an image on an optical disc, which includes a recording face for recording data and a label face for forming an image disposed on an opposite side of the recording face, address information specifying an irradiation radial position, the address information being included in the recording data and wherein no address information is recorded on the label face, the apparatus comprising:

an optical pickup which applies the laser beam of substantially constant power to the optical disc, wherein when the optical pickup is opposed to the recording face, the optical pickup records the data on the recording face, and when the optical pickup is opposed to the label face, the optical pickup forms the image on the label face;

a rotating section which rotates the optical disc at a substantially constant speed;

a feeding section which moves the optical pickup by a movement distance in a radial direction of the optical disc;

a detecting section which detects a radial position of the optical pickup with respect to the optical disc; and a movement distance controlling section which changes the movement distance set by the feeding section in accordance with the radial position of the optical pickup detected by the detecting section when forming the image on the label face, wherein the optical pickup, the rotating section, the feeding section and the detecting section are used for both data recording on the recording face and image forming on the label face, wherein the movement distance controlling section changes the movement distance set by the feeding section to be reduced in a stepwise manner as the radial position of the optical pickup is moved from an inner peripheral side of the optical disc toward an outer peripheral side.

32. An optical disc recording apparatus for forming by a laser beam of substantially constant power an image on an optical disc, which includes a recording face for recording data and a label face for forming an image disposed on an opposite side of the recording face, address information specifying an irradiation radial position, the address information being included in the recording data and wherein no address information is recorded on the label face, the apparatus comprising:

an optical pickup which applies the laser beam of substantially constant power to the optical disc, wherein when the optical pickup is opposed to the recording face, the optical pickup records the data on the recording face, and when the optical pickup is opposed to the label face, the optical pickup forms the image on the label face;

a rotating section which rotates the optical disc at a substantially constant speed;

a feeding section which specifies a movement distance of the optical pickup in a radial direction;

a detecting section which detects a radial position of the optical pickup with respect to the optical disc; and a movement distance controlling section which changes the movement distance specified by the feeding section in accordance with the radial position of the optical pickup detected by the detecting section when forming the image on the label face, wherein the optical pickup, the rotating section, the feeding section and the detecting section are used for both data recording on the recording face and image forming on the label face, wherein the movement distance specified by the feeding section is correlated in advance to a predetermined radial position of the optical pickup.

33. An optical disc recording apparatus for forming by a laser beam of substantially constant power an image on an optical disc, which includes a recording face for recording data and a label face for forming an image disposed on an opposite side of the recording face, address information specifying an irradiation radial position, the address information being included in the recording data and wherein no address information is recorded on the label face, the apparatus comprising:

an optical pickup which applies the laser beam of substantially constant power to the label face of the optical disc to form the image on the label face, wherein when the optical pickup is opposed to the recording face, the optical pickup records the data on the recording face, and when the optical pickup is opposed to the label face, the optical pickup forms the image on the label face, and wherein the label face of the optical disc does not include tracks;

a rotating section which rotates the optical disc at a substantially constant speed;

a feeding section which moves the optical pickup by a movement distance in a radial direction of the optical disc;

a detecting section which detects a radial position of the optical pickup with respect to the optical disc; and a movement distance controlling section which changes the movement distance set by the feeding section in accordance with the radial position of the optical pickup detected by the detecting section when forming the image on the label face, wherein the optical pickup, the rotating section, the feeding section and the detecting section are used for both data recording on the recording face and image forming on the label face.

* * * * *